United States Patent Office 2,941,993
Patented June 21, 1960

2,941,993

PROCESS OF RECOVERING VITAMIN $B_{12}$

Gerard Nomine, Noisy-le-Sec, and Pierre Barthelemy, St.-Germain-en-Laye, France, assignors to UCLAF, Paris, France, a French body corporate No Drawing. Filed June 24, 1958, Ser. No. 744,065

Claims priority, application France July 3, 1957

5 Claims. (Cl. 260—211.5)

The present invention relates to a process of preparing vitamin $B_{12}$ by extracting sewage sludge and the like starting materials.

After methane-producing fermentation such activated sewage sludge contains considerable amounts of compounds with vitamin $B_{12}$ activity. Biological tests show that generally the content of vitamin $B_{12}$ compounds in such a sewage sludge is between about $500\gamma$ and about $1500\gamma$ per kg. of moist sludge which generally contains about 5% to 7% of dry substance. All the vitamin $B_{12}$ activity is retained by the solid fraction of the sewage sludge which is insoluble in water.

It is one object of the present invention to produce a simple and effective process of recovering vitamin $B_{12}$ from such pretreated sewage sludge and the like materials.

Another object of the present invention is to supply the art with a cheap and readily available starting material for the production of vitamin $B_{12}$.

Other objects of the present invention and advantageous features thereof will become apparent as the description proceeds.

In principle, the process of recovering vitamin $B_{12}$ from sewage sludge and the like materials according to the present invention consists in setting free vitamin $B_{12}$ from such sewage sludge and the like materials after they have been subjected to methane-producing fermentation. This is accomplished by treating the starting material at room temperature with calcium hydroxide, $Ca(OH)_2$, which may be used in the form of slaked lime or in the form of an aqueous suspension of calcium hydroxide which is known to the art as milk of lime. The amount of calcium hydroxide employed is preferably between about 0.5% and about 3.0% with respect to the weight of the moist sludge. It is, of course, possible to use larger amounts of calcium hydroxide. However, no increase in yield is achieved thereby. However, the use of such larger amounts of calcium hydroxide does not produce any economic advantage although excess calcium hydroxide does not destroy vitamin $B_{12}$. It is understood, of course, that the process according to the present invention may also be applied to dried sewage sludge materials which represent a commercial product and which are generally used as fertilizer. When using such materials as starting material, they are first moistened before the treatment with slaked lime or they are treated with milk of lime applied in such an amount that the amount of calcium hydroxide contained therein corresponds to an amount between about 10% and about 50% of the weight of the dry sewage sludge.

As a cheap and only slightly corrosive reagent is used and the treatment is carried out at room temperatures, the process according to the present invention can be performed on a large scale without any difficulty.

Another advantage of the process according to the present invention consists in the fact that filtration of the sludge is considerably facilitated due to simultaneous defecation taking place thereby. After allowing the sludge to stand with the slaked lime or the milk of lime for several hours, the reaction mixture is filtered and the filtrate is neutralized and further worked up.

The solid filter residue obtained on filtration of the reaction mixture may be used as fertilizer.

The resulting filtrate containing the vitamin $B_{12}$ content of the sewage sludge is used as starting material in the production of vitamin $B_{12}$ by known extraction and purification processes and, more particularly, by the processes described in copending patent applications Serial Nos. 586,396, now Patent No. 2,879,204, and 586,386, now Patent No. 2,879,203, both filed on May 22, 1956. Said processes consist in precipitating vitamin $B_{12}$ by means of an insoluble complex compound of vitamin $B_{12}$ with zinc cuprocyanide or copper cuprocyanide and by liberating vitamin $B_{12}$ from the precipitated complex compounds by means of a chelating agent, such as the sodium salt of ethylene diamino tetraacetic acid.

The following example serves to illustrate the present invention without, however, limiting the same thereto. More particularly, the reaction duration and the amount of slaked lime or, respectively, of milk of lime may be varied in accordance with the principles set forth herein and in the claims annexed hereto.

*Example*

A sewage sludge which had been subjected to methane-producing fermentation is used as starting material. It contains 6.2% of dry substance. After heating a sample thereof in an autoclave at 120° C. for 20 minutes in the presence of a bisulfite buffer, in order to keep the pH-value of the mixture at a pH of 4.5, biological analysis of said sewage sludge by a plate test with *Lactobacillus leichmannii* according to U.S. Pharmacopeia, 14th edition, 3rd supplement (1951), p. 15, shows that the sludge contains vitamin $B_{12}$ activity in an amount corresponding to $675\gamma$ of vitamin $B_{12}$ per kg. of sewage sludge.

125 g. of powdered slaked lime are added to 5 kg. of such a sewage sludge material. The mixture is homogenized by stirring and allowed to stand for one night. The next morning it has a pH-value of 13.0. The resulting suspension is filtered and the filter cake is washed by means of milk of lime containing 2.5% of calcium hydroxide, $Ca(OH)_2$. The combined filtrate and wash waters are neutralized to a pH-value of 7.0 by the addition of acetic acid. Thereby, 5 l. of a clear yellow solution of vitamin $B_{12}$ containing about $300\gamma$ of vitamin $B_{12}$ per liter are obtained. The yield is 44% of the theoretical yield. The vitamin $B_{12}$ content of said solution is determined as described above.

When treating such a solution of vitamin $B_{12}$ with zinc cuprocyanide under reaction conditions described in the patent application Serial No. 586,396, filed on May 22, 1956, a concentrated solution of vitamin $B_{12}$ is obtained. Spectrophotometric analysis according to the method of Rudkin shows that the yield of vitamin $B_{12}$ obtained thereby from the starting solution corresponds to 69% of the theoretical amount. Paper chromatographic analysis shows only one spot, the $R_f$-value of which corresponds to that of cyanocobalamine.

We claim:

1. In a process of recovering vitamin $B_{12}$ from sewage sludge the steps which comprise reacting sewage sludge which has been subjected to a methane-producing fermentation at room temperature with calcium hydroxide in the presence of water until the vitamin $B_{12}$ has been passed into solution, filtering the reaction mixture, and neutralizing the filtrate.

2. The process according to claim 1, wherein said sewage sludge is reacted with calcium hydroxide selected from the group consisting of slaked lime and milk of lime.

3. The process according to claim 1, wherein dried activated sewage sludge is reacted with milk of lime.

4. The process according to claim 1, wherein a dried activated sewage sludge is suspended in water and reacted with slaked lime.

5. The process according to claim 1, wherein calcium hydroxide is added in an amount between about 10% and about 50% of the dry substance content of the sewage sludge to be treated.

References Cited in the file of this patent

FOREIGN PATENTS 2,653,900  Netherlands _____ Sept. 29, 1953